United States Patent
Aylward et al.

(10) Patent No.: US 9,223,034 B2
(45) Date of Patent: *Dec. 29, 2015

(54) X-RAY IMAGING PANEL WITH THERMALLY-SENSITIVE ADHESIVE AND METHODS OF MAKING THEREOF

(75) Inventors: Brian P. Aylward, Concord, NC (US); Seshadri Jagannathan, Rochester, NY (US); Kevin L. Bishop, Rochester, NY (US); Richard A. Lombardo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 13/345,796

(22) Filed: Jan. 9, 2012

(65) Prior Publication Data
US 2013/0177773 A1 Jul. 11, 2013

(51) Int. Cl.
| | | |
|---|---|---|
| *G01T 1/20* | (2006.01) | |
| *B32B 27/20* | (2006.01) | |
| *B32B 37/14* | (2006.01) | |
| *B32B 37/15* | (2006.01) | |
| *B32B 37/12* | (2006.01) | |

(52) U.S. Cl.
CPC .............. *G01T 1/2018* (2013.01); *B32B 27/20* (2013.01); *B32B 37/1207* (2013.01); *B32B 37/14* (2013.01); *B32B 37/153* (2013.01); *B32B 2037/1253* (2013.01); *B32B 2310/0806* (2013.01); *B32B 2607/00* (2013.01); *Y10T 428/31855* (2015.04); *Y10T 428/31938* (2015.04)

(58) Field of Classification Search
CPC ....... G01T 1/2018; B32B 27/20; B32B 37/14; B32B 37/153
USPC .......................................... 250/370.11, 483.1
See application file for complete search history.

(56) References Cited

U.S. PATENT DOCUMENTS

| | | | |
|---|---|---|---|
| 3,418,470 A * | 12/1968 | Birkeland | 250/474.1 |
| 5,334,843 A | 8/1994 | Zeman | |
| 5,663,005 A * | 9/1997 | Dooms et al. | 428/690 |
| 6,448,566 B1 * | 9/2002 | Riedner et al. | 250/483.1 |
| 7,547,895 B2 * | 6/2009 | Manivannan et al. | 250/483.1 |
| 8,502,170 B2 * | 8/2013 | Jagannathan et al. | 250/483.1 |
| 2002/0070365 A1 * | 6/2002 | Karellas | 250/581 |
| 2002/0131547 A1 | 9/2002 | Riedner et al. | |
| 2003/0003312 A1 * | 1/2003 | Aylward et al. | 428/480 |

(Continued)

FOREIGN PATENT DOCUMENTS

WO 2004/017095 2/2004

OTHER PUBLICATIONS

H. Fujita, D. Y. Tsai, T. Itoh, K. Doi, J. Morishita, K. Ueda, and A. Ohtsuka, "A simple method for determining the modulation transfer function in digital radiography," IEEE Trans. Med. Imaging 11, pp. 34-39, (1992).

(Continued)

*Primary Examiner* — David Porta
*Assistant Examiner* — Mindy Vu

(57) ABSTRACT

Provided herein are laminated devices including an extruded scintillation screen comprising a scintillator material that does not attract dust, and a thermally-sensitive elastomer binder; and a fiber optic plate. Also provided herein are methods of making a laminated device and methods of making an X-ray imaging panel.

20 Claims, 1 Drawing Sheet

(56) References Cited

U.S. PATENT DOCUMENTS

2006/0227933 A1 10/2006 Cantu et al.
2011/0133092 A1 6/2011 Hansen et al.

OTHER PUBLICATIONS

E. Samei and M. J. Flynn, "A method for measuring the presampling MTF of digital radiographic systems using an edge test device," Med. Phys. 25, pp. 102-113, (1998).

E. Samei, E. Buhr, P Granfors, D Vandenbroucke and X Wang, "Comparison of edge analysis techniques for the determination of the MTF of digital radiographic systems," Physics in Medicine and Biology 50 (15) pp. 3613-3625, (2005).

E Samei, N. T. Ranger, J. T. Dobbins, and Y. Chen, "Intercomparison of methods for image quality characterization. I. Modulation transfer function," Med. Phys. 33, pp. 1454-1465, (2006).

Commonly assigned: U.S. Appl. No. 13/300,925 entitled "X-Ray Imaging Panel With Thermally-Sensitive Adhesive and Methods of Making Thereof," filed Nov. 21, 2011.

International Search Report, International application No. PCT/US2012/064104, Mar. 26, 2013, 2 pages.

\* cited by examiner

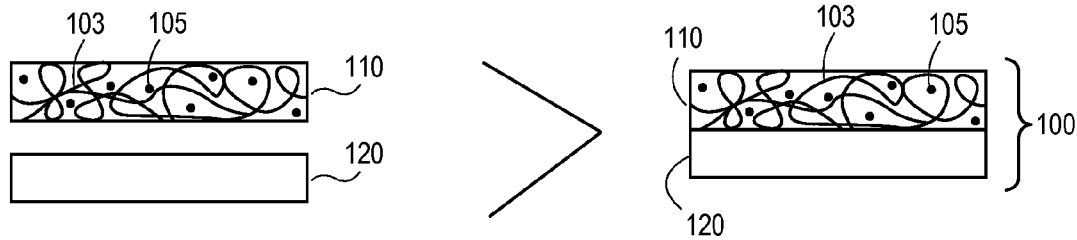
FIG. 1A
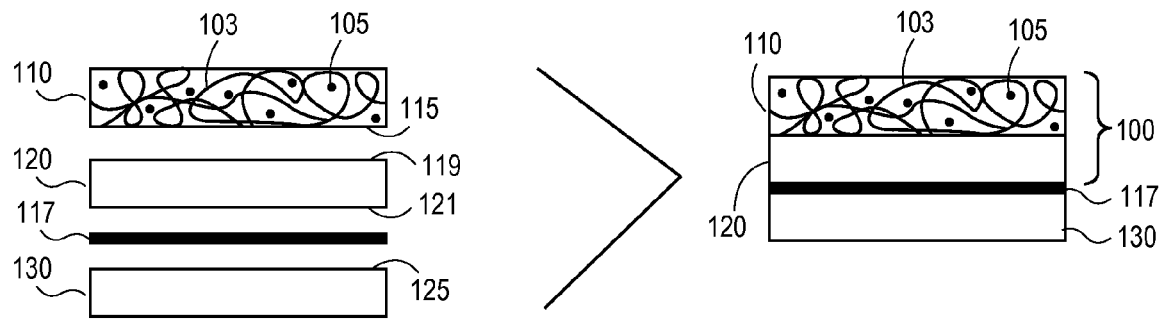
FIG. 1B
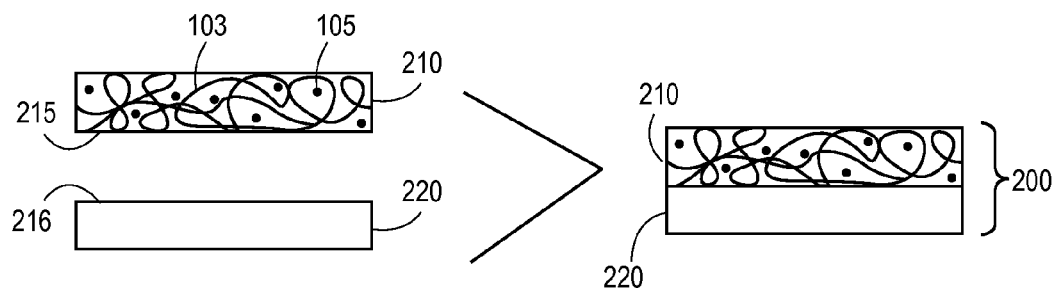
FIG. 2A   FIG. 2B

X-RAY IMAGING PANEL WITH THERMALLY-SENSITIVE ADHESIVE AND METHODS OF MAKING THEREOF

FIELD OF THE INVENTION

The invention relates generally to X-ray imaging systems. More specifically, the invention relates to X-ray imaging panels having improved optical coupling between scintillator and light detector components, and methods for making the same.

BACKGROUND OF THE INVENTION

Digital radiography (DR) is increasingly accepted as an alternative to film-based imaging technologies that rely on photosensitive film layers to capture radiation exposure and thus to produce and store an image of a subject's internal physical features. With digital radiography, the radiation image exposures captured on radiation-sensitive layers in X-ray imaging panels are converted to electronic image data which is then stored in memory circuitry for subsequent readout and display on suitable electronic image display devices.

Generally, a scintillator (or scintillation) screen responds to incident X-ray radiation by generating visible light that is, in turn, detected by a photodetector having photosensors. The light information from the photodetector is subsequently transmitted to charge amplifiers. The outputs of the charge amplifiers are then typically applied to other circuitry that generates digitized image data that then can be stored and suitably image-processed as needed for subsequent storage and display. However, because scintillator materials respond to incident x-ray radiation by emitting light over a broad range of angles, there is some inherent amount of scattering in the detection process. This reduces the optical efficiency of image formation due to loss of light, signal crosstalk, and related effects, and tends to degrade image quality.

For example, a scintillator screen typically has a scintillation layer formed on a support that is highly transmissive to incident X-ray radiation. A protective overcoat layer may optionally be provided over the scintillation layer. Scintillator material in the scintillation layer responds to incident X-rays by emitting photons toward a photosensor, but over a broad range of angles, including angles at which the emitted light is effectively wasted due to total internal reflection (TIR) effects within the scintillation layer or, if provided, the overcoat layer. But so long as there is good optical coupling between the scintillator screen and the photodetector, a sufficient amount of the emitted signal is directed toward the photosensor.

In practice, there is often poor optical coupling between the scintillator screen and the photodetector. Air gaps or airborne contaminants, such as dust, can be trapped between the scintillator screen and the photodetector. For light at very small angles of incidence (relative to normal), the net effect of air gaps or airborne contaminants can be negligible. But for light at larger angles, air gaps or airborne contaminants can cause problems. When light is incident from a dense medium with a higher index of refraction, n, to a rare medium with a lower index of refraction, n', (e.g., n'=1.0 for air), total internal reflection (TIR) may occur at the interface of the two media depending on the angle of incidence. This means that some portion of light is lost, and another portion can be redirected to the wrong photodetector as crosstalk. The net effect includes lost efficiency and reduced spatial resolution, which is generally measured by the modulation transfer function (MTF). (MTF is widely used in many imaging applications as a quantitative way of determining or measuring the resolution or sharpness of imaging devices. In computed or digital radiography, MTF is dominantly decided by the scintillator screens used for X-ray absorption.) Therefore, poor optical coupling due to the presence of air gaps or airborne contaminants at the interface of the scintillator screen and the photodetector can lead to increased TIR, reduced MTF, and result in poor image quality.

Conversely, improved optical coupling between the scintillator screen and the photodetector would help to boost efficiency and improve overall mage quality accordingly. However, previously proposed solutions have shown only limited success, or may achieve improved optical coupling at the cost of increased complexity and higher expense, or may inadvertently introduce other problems. For example, while conventional pressure sensitive adhesives (PSAs), such as acrylic-based adhesives and laminates, have been used in the past to couple scintillator screens and photodetectors, PSAs are aggressively tacky at room temperature and strongly attract airborne contaminants such as dust.

Thus, while prior techniques may have achieved certain degrees of success in their particular applications, there is still room for improvement. Solutions that reduce or eliminate air gaps and/or airborne contaminants at the scintillator screen/photodetector interface without an elaborate number of steps and using materials appropriate for the scintillator or detector components would be particularly helpful.

SUMMARY OF THE INVENTION

In an aspect, there is provided a laminated device comprising an extruded scintillator screen comprising a scintillator material that does not attract dust, and a thermally-sensitive elastomer binder; and a fiber optic plate.

In another aspect, there is also disclosed a method of making a laminated device comprising forming a scintillator screen by extruding thermoplastic particles comprising a scintillator material and a thermally-sensitive elastomeric binder; and laminating the scintillator screen to a fiber optic plate.

In a further aspect, there is disclosed a method of making an X-ray imaging panel comprising forming a scintillator screen by extruding thermoplastic particles comprising a scintillator material and a thermally-sensitive elastomer binder; laminating the scintillator screen to a fiber optic plate to form a laminated device; and coupling the laminated device to at least one photodetector.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 1A and 1B depict cross-sectional views of an X-ray imaging panel in accordance with various embodiments of the present disclosure.

FIGS. 2A and 2B depict cross-sectional views of an X-ray imaging panel in accordance with various embodiments of the present disclosure.

DETAILED DESCRIPTION OF THE INVENTION

The following is a detailed description of the preferred embodiments of the invention, reference being made to the drawings in which the same reference numerals identify the same elements of structure in each of the several figures.

As described earlier, conventional optical adhesives have been proposed and utilized for maintaining contact between the scintillator screen and the photodetector array in a number of X-ray imaging panel designs; however, such conventional optical adhesives have presented difficulties, e.g., trapping airborne contaminants. The present disclosure provides an X-ray imaging panel wherein the scintillator screen and photodetector components are optically coupled or bonded together using an optical adhesive comprising a thermally-sensitive elastomer.

Scintillation screens disclosed herein can take any convenient form provided they meet all of the usual requirements for use in computed or digital radiography. The scintillation screen can be extruded or injection molded. The scintillation screen can include an extruded scintillation layer. The scintillation layer includes a scintillator material 105 and a thermally-sensitive elastomer binder 103.

In embodiments, the thermally-sensitive elastomer binder 103 can be a thermoplastic polyolefin. Non-limiting useful thermoplastic polyolefins include polyethylene (e.g., LLDPE, LDPE, HDPE, and the like), polypropylene, ethylene vinyl acetate (EVA) and combinations thereof. In an aspect, the polyethylene can be high density poly low density polyethylene (LDPE), medium density polyethylene (MDPE), linear low density polyethylene (LLDPE), very low density polyethylene (VLDPE), and the like, and combinations thereof. In a preferred embodiment, the thermoplastic polyolefin is low density polyethylene (LDPE). The thermoplastic polyolefin can be present in the scintillation screen in an amount ranging from about 1% to about 99% by volume, for example from about 20% to about 80% by volume, relative to the total volume of the scintillation screen.

As used herein, "scintillator material" and "scintillation material" are used interchangeably and are understood to mean a material emitting photons upon exposure to electromagnetic radiation, as ordinarily understood by those skilled in the art, unless otherwise specified. For example, "scintillator material" can refer to inorganic materials capable of immediately emitting low-energy photons (e.g., optical photons) upon stimulation with and absorption of high-energy photons (e.g., X-rays). Suitable scintillator materials 105 that can be used in embodiments of the present disclosure include metal oxides, metal oxyhalides, metal oxysulfides, metal halides, and the like, and combinations thereof.

In some embodiments, the scintillator material can be a metal oxide, for example, $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $RE_3Al5O_{12}$:Ce, and combinations thereof, wherein RE is at least one rare earth metal.

In another embodiment, the scintillator material can include one or more metal oxysulfides in addition to, or in place of, the metal oxides, such as $Gd_2O_2S$, $Gd_2O_2S$:Tb, $Gd_2O_2S$:Pr, and the like, and combinations thereof.

In other embodiments, the scintillator material can include a metal oxyhalide, such as LaOX:Tb, wherein X is Cl, Br, or I.

In further embodiments, the scintillator material can be a metal halide having a general formula of $M(X)_n$:Y, wherein M is at least one of La, Na, K, Rb, Cs; each X is independently F, Cl, Br, or I; Y is at least one of Tl, Tb, Na, Ce, Pr, and Eu; and n is an integer between 1 and 4, inclusive. Such metal halides can include, for example, $LaCl_3$:Ce and $LaBr_3$:Ce, among others. Other metal halide species that can be used in embodiments of the present disclosure include $RbGd_2F_7$:Ce, $CeF_3$, $BaF_2$, CsI(Na), $CaF_2$:Eu, LiI:Eu, CsI, CsF, CsI:Tl, NaI:Tl, and combinations thereof. Halide-like species, such as CdS:In, and ZnS can also be used in embodiments of the present disclosure. Preferably, the scintillator material is a metal oxysulfide, such as $Gd_2O_2S$.

In embodiments, the scintillator material 105 can be present in the scintillation layer in an amount ranging from about 50% by volume to about 99% by volume, for example from about 70% by volume to about 90% by volume, relative to the volume of the extruded scintillation screen.

The thickness of the scintillation layer can range from about 10 µm to about 1000 µm, for example from about 50 µm to about 750 µm, such as from about 100 µm to about 500 µm.

In embodiments, the scintillator material 105 and thermally-sensitive elastomer binder 103 are melt compounded to form composite thermoplastic particles which are then extruded to form the scintillation screen. For example, the composite thermoplastic particles can be prepared by melt compounding the scintillator material with a thermally-sensitive elastomer binder using a twin screw compounder. The ratio of thermally-sensitive elastomer binder to scintillator material (binder: scintillator) can range from about 1:100 to about 1:0.01, by weight or volume, preferably from about 1:1 to about 1:0.1, by weight or volume. During melt compounding, the thermally-sensitive elastomer binder and the scintillator material can be compounded and heated through ten heating zones. For example, the first heating zone can have a temperature ranging from about 175° C. to about 180° C.; the second heating zone can have a temperature ranging from about 185° C. to about 190° C.; the third heating zone can have a temperature ranging from about 195° C. to about 200° C.; the fourth heating zone can have a temperature ranging from about 195° C. to about 200° C.; the fifth heating zone can have a temperature ranging from about 185° C. to about 190° C.; the sixth heating zone can have a temperature ranging from about 185° C. to about 190° C.; the seventh heating zone can have a temperature ranging from about 185° C. to about 190° C.; the eighth heating zone can have a temperature ranging from about 185° C. to about 190° C.; the ninth heating zone can have a temperature ranging from about 180° C. to about 175° C.; and the tenth heating zone can have a temperature ranging from about 175° C. to about 170° C. The period of time in each zone depends on the thermally-sensitive elastomer binder used. Generally, the elastomer binder can be heated for a time and temperature sufficient to melt the binder and incorporate the scintillator material without decomposing the thermally-sensitive elastomer binder. The period of time in each zone can range from about 0.1 minutes to about 30 minutes, for example from about 1 minute to about 10 minutes. Upon exiting the melt compounder, the composite thermoplastic material can enter a water bath to cool and harden into continuous strands. The strands can be pelletized and dried at about 40° C. The screw speed and feed rates for each of the thermally-sensitive elastomer binder and the scintillator material can be adjusted as desired to control the amount of each in the composite thermoplastic material.

As shown in FIG. 1A, the composite thermoplastic material can be extruded to form a scintillation layer 101 in which the scintillator material 105 is intercalated ("loaded") within the thermally-sensitive elastomer binder 103. For example, the disclosed scintillation screen can be formed by melt extruding the composite thermoplastic material to form a scintillation layer 101. The scintillation layer can provide a light-emitting surface 115 for the scintillation screen 110.

In an aspect, an opaque layer can be included in the scintillation screen to eliminate ambient light from reaching the scintillation layer. For example, in an embodiment, the opaque layer can comprise black dyes or carbon black and a suitable binder, such as polyethyelene (e.g., LDPE). In an aspect, the opaque layer can be co-extruded with the scintillation layer.

The extruded scintillation screens can be directly or indirectly coupled to at least one photodetector. The at least one photodetector can have a light-receiving surface and can be configured to detect photons generated from the light-emitting surface of the scintillation screen. Non-limiting examples of at least one photodetector include photodiodes, photomultiplier tubes (PMT), CCD sensors (e.g., EMCCD), image intensifiers, and the like, and combinations thereof. Choice of a particular photodetector will depend, in part, on the type of scintillation screen being fabricated and the intended use of the ultimate device fabricated with the disclosed scintillation screen.

In embodiments, the extruded scintillator screen 110 can be coupled to a fiber optic plate (FOP) 120 to form a laminated X-ray imaging element, which can be coupled to at least one photodetector 130. As shown in FIG. 1B, the FOP 120 can have a first surface 119 and a second surface 121 opposite the first surface. The FOP 120 can be positioned between the extruded scintillation screen 110 and the at least one photodetector 130. Typically, the light from a radiation image is transmitted from the scintillator screen to the photodetector through each fiber in the FOP. Thus, even though the scintillator screen is coupled to the FOP, the scintillation properties of its light-emitting surface are maintained. In an aspect, the light-emitting surface 115 of the extruded scintillation screen 110 can be coupled to a first surface 119 of the FOP 120 (thereby maintaining its scintillation properties) and the light-receiving surface 125 of the photodetector 130 can be coupled to a second surface 121 opposite the first surface 119 of the FOP 120 in a sandwich-like fashion, as shown in FIG. 1B, to form an X-ray imaging panel 100.

The extruded scintillation screen 110 can be coupled to the FOP 120 without an additional adhesive between the scintillation screen 110 and the FOP 120. In other words, in an embodiment, no additional adhesive is disposed between the extruded scintillation screen 110 and the FOP 120. The photodetector 130 can be coupled to the FOP 120 using an optically clear, light transmissive adhesive 117. An exemplary optical adhesive is described in U.S. patent application Ser. No. 13/300,925 entitled "X-RAY IMAGING PANEL WITH THERMALLY-SENSITIVE ADHESIVE AND METHODS OF MAKING THEREOF" filed on Nov. 21, 2011, the disclosure of which is hereby incorporated by reference in its entirety.

In other embodiments, the extruded scintillator screen 210 can be coupled directly to at least one photodetector 220, without a FOP. As shown in FIGS. 2A and 2B, the light-emitting surface 215 of the scintillation screen 210 can be directly coupled or bonded to the light-receiving surface 216 of the at least one photodetector 220 to form an X-ray imaging panel 200. In an aspect, no additional adhesive is disposed between the extruded scintillation screen 210 and the photodetector 220.

In aspects, there is disclosed herein a method of making an X-ray imaging panel, including providing an extruded scintillation screen comprising a scintillator material and a thermally-sensitive elastomer binder; providing a fiber optic glass plate; laminating the fiber optic glass plate and the scintillation screen to produce a laminated X-ray imaging element; providing at least one photodetector; and coupling the laminated X-ray imaging element to the at least one photodetector. Any lamination technique known in the art suitable for preparing X-ray imaging panels can be used herein without limitation. The laminated X-ray imaging element can be coupled to the at least one photodetector using an optically clear, light transmissive adhesive. An exemplary optical adhesive is described in U.S. patent application Ser. No. 13/300,925 entitled "X-RAY IMAGING PANEL WITH THERMALLY-SENSITIVE ADHESIVE AND METHODS OF MAKING THEREOF" filed on Nov. 21, 2011, the disclosure of which is hereby incorporated by reference in its entirety.

Without being limited by theory, it is believed that when heat and pressure from lamination techniques are applied to the disclosed scintillation screen, the heat and pressure "activate" the thermally-sensitive elastomer to form a bonding surface without interfering with the light emitting qualities of the scintillation screen. In other words, the light-emitting surface of the scintillation screen becomes adhesive upon "activation" with heat and pressure from lamination techniques. However, at room temperature, the light-emitting surface of the scintillation screen is minimally tacky and has a low propensity for attracting airborne contaminants. In comparison, as discussed above, conventional adhesives like PSAs are aggressively tacky at room temperature and strongly attract and trap airborne contaminants. As such, a scintillation screens including the thermally-sensitive elastomer binder can be stored for a period of time and later coupled or bonded to a surface via lamination techniques. In other words, a scintillator screen including the thermally-sensitive elastomer binder can be stored for a period time without needing to be immediately bonded to a surface, and the resultant fabricated device with the scintillation screen still displays desirable image quality.

Accordingly, because the disclosed scintillation screen repels far more airborne contaminates than conventional scintillation screen coated with PSA adhesives at room temperature, X-ray imaging panels fabricated with the disclosed scintillation screens comprising thermally-sensitive elastomers will show reduced TIR (increased MTF) and therefore display improved image quality as compared to X-ray imaging panels manufactured with conventional PSA adhesives.

EXAMPLES

Comparative Example 1

A scintillator dispersion was prepared by first diluting 66.9 g of a 15% solution of Permuthane U-6366 binder from Stahl International in a mixture of a Methylene Chloride and Methanol (weight ratio of Methylene Chloride to Methanol in this dispersion was 12.7:1) with 34.7 g of the same solvent mixture of a Methylene Chloride and Methanol (The weight ratio of Methylene Chloride to Methanol in this dispersion was 12.7:1). Next, 300.0 g of terbium doped gadolinium oxysulfide, type 3010-55 from Nichia Corporation was added to the solution while mixing with a high speed mixer.

The scintillator dispersion prepared above was applied using a slot coating process to 7-mil thick polyethylene terephthalate (PET) films so as to achieve a dry scintillator coverage of approximately 40 g/ft$^2$ on each film. The PET support was pre-treated to improve adhesion of the scintillator coating. To improve coating uniformity, each PET film was cooled to a temperature of 15° C. during application of the scintillator dispersion. Once coated, each film was allowed to dry for 20 minutes while maintaining a film temperature of 15° C. The scintillator-coated films were then placed in a 70° C. oven for 5 minutes to remove residual solvent, forming scintillator screens.

Comparative Example 2

An acrylic adhesive coating solution was prepared by mixing 75 g of a polyacrylate PSA solution (Gelva GMS 788 from Cytec Industries) with 425 g of Ethyl Acetate. The acrylic adhesive solution was applied using a slot coating process over the scintillator screens in Comparative Example 1. The sample was laminated using a Differential Pressure Laminator onto a fiber optic glass plate (FOP) according to the conditions described below in Table 1.

TABLE 1

| Example | Lamination Temperature (° F.) | Vacuum Dwell (min) | Pressure Dwell (min) | Diaphragm Pressure (psi) |
|---|---|---|---|---|
| Comparative Example 1 | 310 | 1 | 8 | 15 |

Inventive Example 1

Composite thermoplastic particles according to the present disclosure were prepared comprising 80 wt. % gadolinium oxysulfide ($Gd_2O_2S$) ("GOS") and 20 wt. % low density polyethylene (LDPE 811A, available from Westlake Chemical Corp. of Houston, Tex.). The GOS powder was loaded into Feeder 2 and the LDPE was loaded into Feeder 4 of a Leistritz twin screw compounder. The die temperature was set to 200° C. and 10 heating zones within the compounder were set to the temperatures shown in Table 1 below:

TABLE 2

| Zone | 1 | 2 | 3 | 4 | 5 | 6 | 7 | 8 | 9 | 10 |
|---|---|---|---|---|---|---|---|---|---|---|
| Temp (° C.) | 180 | 190 | 200 | 200 | 190 | 190 | 190 | 190 | 175 | 170 |

The screw speed was 300 RPM, and the GOS powder and LDPE were gravity fed into the screw compounder. After exiting the die, the composite thermoplastic particles, comprising LDPE loaded with $Gd_2O_2S$, entered a 25° C. water bath to cool and hardened into continuous strands. The strands were then pelletized in a pelletizer and dried at 40° C.

5% carbon black particles in LDPE were prepared by melt compounding carbon black masterbatch (Ampacet black MB—191029, available from Amapacet Corp. of Tarrytown, N.Y.) with LDPE (811A, available from Westlake Chemical Corp. of Houston, Tex.) in a Leistritz twin screw compounder under the same conditions used to produce the composite thermoplastic material. The carbon black masterbatch was loaded into Feeder 1 and the LDPE was loaded into Feeder 4 of the twin screw compounder. The screw speed was 300 RPM, and the carbon black and LDEP were gravity fed into the screw compounder. After exiting the die, the carbon black entered a 25° C. water bath to cool and hardened into continuous strands. The strands were then pelletized in a pelletizer and dried at 40° C.

The pelletized composite thermoplastic materials were loaded into a single screw Killion extruder. Within the extruder, heating zones were set to the temperatures shown in Tables 3A and 3B below.

TABLE 3A

Davis-Standard Extruder

| Zone | Temp |
|---|---|
| 1 | 350° F. |
| 2 | 380° F. |
| 3 | 400° F. |
| Exit flange | 400° F. |
| Poly line 1 | 400° F. |
| Poly line 2 | 400° F. |
| Melt pump | 400° F. |

TABLE 3B

Killion Extruder

| Zone | Temp |
|---|---|
| 1 | 350° F. |
| 2 | 380° F. |
| 3 | 400° F. |
| 4 | 400° F. |
| Gate | 400° F. |
| Adapter | 400° F. |
| Poly line | 400° F. |
| Melt pump | 400° F. |

Both types of pelletized materials (composite thermoplastic and carbon black) were co-extruded through a single die with the die temperature set at 400° F. to form scintillation screens. The pelletized composite thermoplastic material formed a transparent scintillation layer, and the pelletized carbon black formed a carbon black layer underneath the transparent scintillation layer. The RPM of the melt pump and the screw speed were manipulated to vary the thicknesses of the resultant screens. The pelletized composite thermoplastic material formed a transparent scintillation layer, and the pelletized carbon black formed a carbon black layer underneath the transparent scintillation layer.

The scintillation screen had the following characteristics:

Scintillation Layer:

Thickness—4 mil (100 microns)

GOS—87.5% by weight {weight of GOS/(weight of GOS+weight of LDPE)}

LDPE—12.5% by weight {weight of LDPE/(weight of LDPE+weight of LDPE)}

The sample was laminated using a Differential Pressure Laminator onto a fiber optic glass plate (FOP) according to the conditions described below in Table 4.

TABLE 4

| Example | Lamination Temperature (° F.) | Vacuum Dwell (min) | Pressure Dwell (min) | Diaphragm Pressure (psi) |
|---|---|---|---|---|
| Inventive Example 1 | 350 | 1 | 8 | 14 |

Inventive Example 2

A scintillation screen was prepared using the same process as Inventive Example 1. The scintillation screen had the following characteristics:
Scintillation Layer:
Thickness—6 mil (150 microns)
GOS—87.5% by weight {weight of GOS/(weight of GOS+weight of LDPE)}
LDPE—12.5% by weight {weight of LDPE/(weight of LDPE+weight of LDPE)}
The sample was laminated using a Differential Pressure Laminator onto a fiber optic glass plate (FOP) according to the conditions described below in Table 5.

TABLE 5

| Example | Lamination Temperature (° F.) | Vacuum Dwell (min) | Pressure Dwell (min) | Diaphragm Pressure (psi) |
|---|---|---|---|---|
| Inventive Example 2 | 350 | 1 | 8 | 14 |

Inventive Example 3

A scintillation screen was prepared using the same process as Inventive Example 1. The scintillation screen had the following characteristics:
Scintillation Layer:
Thickness—20 mil (500 microns)
GOS—87.5% by weight {weight of GOS/(weight of GOS+weight of LDPE)}
LDPE—12.5% by weight {weight of LDPE/(weight of LDPE+weight of LDPE)}
The sample was laminated using a Differential Pressure Laminator onto a fiber optic glass plate (FOP) according to the conditions described below in Table 6.

TABLE 6

| Example | Lamination Temperature (° F.) | Vacuum Dwell (min) | Pressure Dwell (min) | Diaphragm Pressure (psi) |
|---|---|---|---|---|
| Inventive Example 2 | 350 | 1 | 8 | 14 |

Dust Assessment

To assess the adhesive coatings' propensity to trap airborne contaminates such as dust, 1 sq. in. samples of Comparative Example 2 and Inventive Example 1 were placed on a lab bench with the adhesive layers facing upward. The samples were left uncovered for 1 hour. The samples were then transferred to a Clean Hood. Compressed air was used to blow any free contaminate off the surface of the adhesive coatings. Samples were then examined under 7× magnification for the presence of trapped particle contaminate.

MTF Assessment

Many well-established methods can be used for measuring MTF, all of which basically involve capturing the gray scale gradation transition in the X-ray image of an object that provides an abrupt change in X-ray signal from high to low. Exemplary methods of measuring MTF are described in U.S. patent application Ser. No. 13/300,925 entitled "X-RAY IMAGING PANEL WITH THERMALLY-SENSITIVE ADHESIVE AND METHODS OF MAKING THEREOF" filed on Nov. 21, 2011; H. Fujita, D. Y. Tsai, T. Itoh, K. Doi, J. Morishita, K. Ueda, and A. Ohtsuka, "A simple method for determining the modulation transfer function in digital radiography," IEEE Trans. Med. Imaging 11, 34-39 (1992); E. Samei and M. J. Flynn, "A method for measuring the presampling MTF of digital radiographic systems using an edge test device," Med. Phys. 25, 102-113 (1998); E. Samei, E. Buhr, P Granfors, D Vandenbroucke and X Wang, "Comparison of edge analysis techniques for the determination of the MTF of digital radiographic systems," Physics in Medicine and Biology 50 (15) 3613 (2005); E Samei, N. T. Ranger, J. T. Dobbins, and Y. Chen, "Intercomparison of methods for image quality characterization. I. Modulation transfer function," Med. Phys. 33, 1454 (2006), the disclosures all of which are herein incorporated by reference in their entirety.

Here, a Kodak RVG 5100 digital radiography sensor was used for all MTF measurements. The results from the various tests are summarized in Table 7 below.

TABLE 7

| Example | Scintillation Layer Thickness (microns) | Dust Adhesion (# dust particles/ sq. in) | MTF Line Pairs/mm @ MTF of 0.2 |
|---|---|---|---|
| Comparative Example 1 | 100 | 0 | 3.89 |
| Comparative Example 2 | 100 | 19 | 6.24 |
| Inventive Example 1 | 100 | 0 | 7.53 |
| Inventive Example 2 | 150 | 0 | 5.65 |
| Inventive Example 3 | 500 | 0 | 3.86 |

As shown in Table 7, Inventive Examples 1-3 (with thermally-sensitive elastomer binder) repelled dust as well as Comparative Example 1 (no adhesive) and nearly 20 times better than Comparative Example 2 (PSA adhesive).

Furthermore, Inventive Example 1 displayed a higher MTF value than Comparative Example 2. Thus, at the same scintillation layer thickness (100 microns), the disclosed scintillation screen exhibited better image quality than a scintillation screen fabricated with a conventional PSA adhesive Likewise, Inventive Example 3 (500 microns) displayed a comparable MTF (and therefore comparable image quality) compared to Comparative Example 1 (100 microns) despite being 5 times thicker.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A laminated device comprising:
   a melt extruded scintillation screen that does not attract dust through adhesion at room temperature comprising a scintillator material and a thermally-sensitive elastomer binder; and
   a fiber optic plate or at least one photodetector.

2. The laminated device of claim 1, wherein the thermally-sensitive elastomer binder comprises a thermoplastic polyolefin.

3. The laminated device of claim 2, wherein the thermoplastic polyolefin is selected from the group consisting of high density polyethylene (HDPE), low density polyethylene (LDPE), medium density polyethylene (MDPE), linear low density polyethylene (LLDPE), very low density polyethylene (VLDPE), and combinations thereof.

4. The laminated device of claim 1, wherein a first surface of the melt extruded scintillation screen is in continuous contact with the fiber optic plate or the at least one photodetector, and at least one second surface away from the fiber optic plate or the at least one photodetector does not attract dust through adhesion at room temperature.

5. The laminated device of claim 1, wherein the thermally-sensitive elastomer binder is present in the scintillator screen in an amount ranging from about 1% by volume to about 99% by volume relative to the total volume of the scintillator screen.

6. The laminated device of claim 1, wherein the thermally-sensitive elastomer binder is present in the scintillator screen in an amount ranging from about 20% by volume to about 80% by volume, relative to the total volume of the scintillator screen.

7. The laminated device of claim 1, wherein the scintillator material comprises at least one phosphor selected from the group consisting of $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $Gd_2O_2S$:Tb, $Gd_2O_2S$:Pr; $RE_3Al5O_{12}$:Ce, and combinations thereof, wherein RE is at least one rare earth metal.

8. The laminated device of claim 1, wherein the scintillator material is present in the scintillation screen in an amount ranging from about 50% by volume to about 99% by volume, relative to the total volume of the scintillation screen.

9. A method of making a laminated device comprising:
melt extruding a scintillator screen that does not attract dust by melt extruding the scintillator screen comprising a scintillator material and a thermally-sensitive elastomer binder, wherein the thermally-sensitive elastomer binder comprises a thermoplastic polyolefin; and
laminating the scintillator screen to a fiber optic plate or at least one photodetector.

10. The method of making a laminated device according to claim 9, wherein the thermoplastic polyolefin is selected from the group consisting of high density polyethylene (HDPE), low density polyethylene (LDPE), medium density polyethylene (MDPE), linear low density polyethylene (LLDPE), very low density polyethylene (VLDPE), and combinations thereof.

11. The method of making a laminated device according to claim 9, wherein the thermally-sensitive elastomer binder comprises low density polyethylene (LDPE).

12. The method of making a laminated device according to claim 9, wherein the thermally-sensitive elastomer binder is present in the scintillation screen in an amount ranging from about 1% by volume to about 99% by volume relative to the total volume of the scintillation screen, or wherein the thermally-sensitive elastomer binder is present in the scintillation screen in an amount ranging from about 20% by volume to about 80% by volume, relative to the total volume of the scintillation screen.

13. The method of making a laminated device according to claim 9, wherein the scintillation screen does not attract dust at room temperature.

14. The method of making a laminated device according to claim 9, wherein the scintillator material is present in the scintillation screen in an amount ranging from about 50% by volume to about 99% by volume, relative to the total volume of the scintillation screen.

15. A method of making an X-ray imaging panel comprising:
injection molding a scintillator screen that does not attract dust through adhesion at room temperature by injection molding thermoplastic particles comprising a scintillator material and a thermally-sensitive elastomer binder;
laminating the injection molded scintillator screen to a fiber optic plate or at least one photodetector to form a laminated device; and
coupling the fiber optic plate to at least one photodetector sensor.

16. The method of making an X-ray imaging panel according to claim 15, wherein the thermally-sensitive elastomer binder comprises a thermoplastic polyolefin.

17. The method of making an X-ray imaging panel according to claim 16, wherein the thermoplastic polyolefin is selected from the group consisting of high density poly low density polyethylene (LDPE), medium density polyethylene (MDPE), linear low density polyethylene (LLDPE), very low density polyethylene (VLDPE), and combinations thereof.

18. The method of making an X-ray imaging panel according to claim 15, wherein the thermally-sensitive elastomer binder comprises low density polyethylene (LDPE).

19. The method of making an X-ray imaging panel according to claim 15, wherein the thermally-sensitive elastomer binder is present in the scintillation screen in an amount ranging from about 1% by volume to about 99% by volume relative to the total volume of the scintillation screen.

20. A laminated device comprising:
an injection molded extruded scintillation screen that does not attract dust through adhesion at room temperature comprising a scintillator material and a thermally-sensitive elastomer binder; and
a fiber optic plate or at least one photodetector attached to the injection molded extruded scintillation screen, where a first surface of the injection molded extruded scintillation screen is in continuous contact with the fiber optic plate or the at least one photodetector, and at least one second surface away from the fiber optic plate or the at least one photodetector does not attract dust through adhesion at room temperature.

* * * * *